United States Patent
Chen et al.

(10) Patent No.: US 9,801,154 B1
(45) Date of Patent: Oct. 24, 2017

(54) METHOD AND LOCATION-DETERMINING DEVICE FOR CORRECTING POSITIONING LOCATION

(71) Applicant: AthenTek Incorporated, Taipei (TW)

(72) Inventors: Chun-Nan Chen, Taipei (TW); Ivy H. Tseng, Taipei (TW)

(73) Assignee: AthenTek Incorporated, Taipei (TW)

( * ) Notice: Subject to any disclaimer, the term of this patent is extended or adjusted under 35 U.S.C. 154(b) by 0 days.

(21) Appl. No.: 15/482,607

(22) Filed: Apr. 7, 2017

(51) Int. Cl.
*H04W 24/00* (2009.01)
*H04W 64/00* (2009.01)
*H04L 29/08* (2006.01)
*H04W 48/04* (2009.01)
*H04W 4/02* (2009.01)

(52) U.S. Cl.
CPC ....... *H04W 64/00* (2013.01); *H04L 29/08657* (2013.01); *H04W 4/02* (2013.01); *H04W 48/04* (2013.01)

(58) Field of Classification Search
CPC ....... H04W 64/00; H04W 4/02; H04W 48/04; H04L 29/08657
See application file for complete search history.

(56) References Cited

U.S. PATENT DOCUMENTS

| | | | | |
|---|---|---|---|---|
| 2005/0070308 A1* | 3/2005 | Caspi | ................... | H04W 64/00 455/456.3 |
| 2011/0124317 A1* | 5/2011 | Joo | ....................... | H04L 63/18 455/411 |
| 2015/0351013 A1* | 12/2015 | Zhang | ................... | H04W 48/18 370/328 |
| 2017/0041866 A1* | 2/2017 | Sharma | ................. | H04W 48/18 |

* cited by examiner

*Primary Examiner* — Ajit Patel

(57) ABSTRACT

A method for correcting a positioning location is provided. The method includes: receiving current positioning information; comparing a current Mobile Country Code (MCC) comprised in the current positioning information with a previous MCC comprised in previous positioning information; determining whether a moving speed of a mobile device is greater than a speed threshold according the current positioning information and the previous positioning information when the current MCC is the same as the previous MCC; determining whether the mobile device has moved after determining that the moving speed is not greater than the speed threshold; and identifying a final positioning location according to a determination result indicating whether the mobile device has moved.

24 Claims, 7 Drawing Sheets

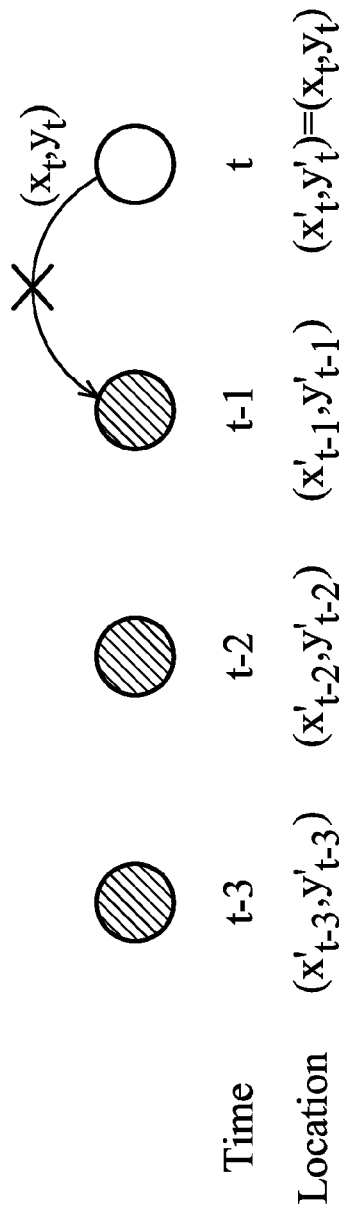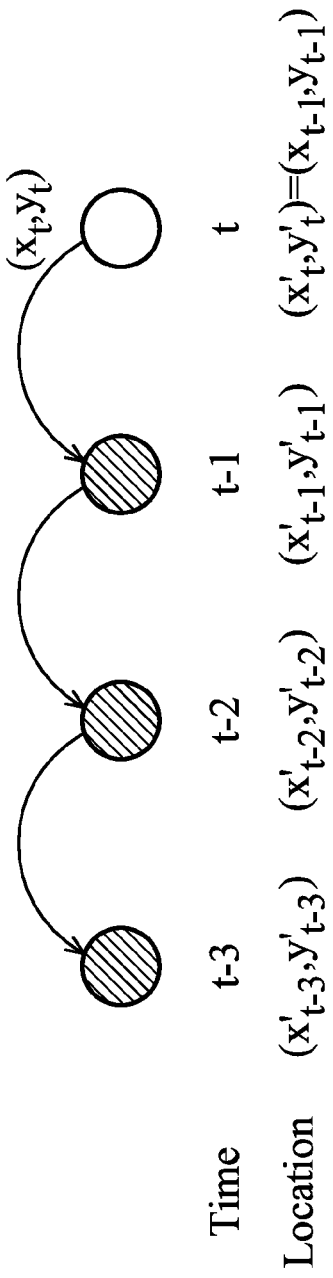

METHOD AND LOCATION-DETERMINING DEVICE FOR CORRECTING POSITIONING LOCATION

BACKGROUND OF THE INVENTION

Field of the Disclosure

The present disclosure relates to the field of wireless communications. More specifically, the present disclosure relates to a method and a location-determining device for correcting a positioning location.

Description of the Related Art

A device can determine its location by processing location data from various sources (e.g., Global Positioning System (GPS), Wi-Fi networks, and cellular networks) and identifying a probable positioning location.

Some devices scan for observable access points (APs) in the Wi-Fi networks based on a crowdsourcing Wi-Fi database to derive estimated locations of the devices and report the estimated locations to an end user. The purpose is to report the estimated locations to the end user in a way that is pleasing to the end user. The definition of "pleasing to the end user" usually means positioning results that (1) reflect the true location of the device, (2) are stable, and (3) are without sudden jumps.

However, due to the nature of crowdsourcing, the locations of some Wi-Fi APs stored in the crowdsourcing database will be incorrect. It may result in large positioning errors and large position jumps. Also, due to the fluctuating nature of Wi-Fi signals, undesirable positioning jitter may be caused by Wi-Fi signal strength fluctuation. Furthermore, the positioning results may not be exactly the same even if the device stays at the same place.

Therefore, a method and a location-determining device for correcting a positioning location are needed to solve the problems described above.

BRIEF SUMMARY OF THE INVENTION

The following summary is illustrative only and is not intended to be limiting in any way. That is, the following summary is provided to introduce concepts, highlights, benefits, and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

A method and a location-determining device for correcting a positioning location are provided.

In a preferred embodiment, a method for correcting a positioning location is provided in the disclosure. The method comprises: receiving current positioning information from a mobile device; comparing a current Mobile Country Code (MCC) comprised in the current positioning information with a previous MCC comprised in previous positioning information from the mobile device; determining whether a moving speed of the mobile device is greater than a speed threshold according the current positioning information and the previous positioning information when the current MCC is the same as the previous MCC; determining whether the mobile device has moved after determining that the moving speed is not greater than the speed threshold; and identifying a final positioning location according to a determination result indicating whether the mobile device has moved.

In some embodiments, the method further comprises: setting the final positioning location equal to a current positioning location comprised in the current positioning information when the current MCC is not the same as the previous MCC. In some embodiments, the method further comprises: setting the final positioning location to null after determining that the moving speed is greater than the speed threshold. In some embodiments, the method further comprises: setting the final positioning location equal to a current positioning location comprised in the current positioning information after determining that the mobile device has moved. In some embodiments, the method further comprises: setting the final positioning location equal to one of previous positioning locations comprised in the previous positioning information after determining that the mobile device has not moved. In some embodiments, determining whether the mobile device has moved comprises: computing a first similarity score between a current positioning location and a previous positioning location according to first current RSSIs and first previous RSSIs detected in a first wireless network; computing a second similarity score between the current positioning location and the previous positioning location or comparing cell identifiers (cell IDs) at a current positioning time and previous positioning times in a second wireless network; and determining that the mobile device has not moved when the first similarity score is greater than a first threshold and the second similarity score is greater than a second threshold or the first similarity score is greater than the first threshold and a comparison result satisfies a condition. In some embodiments, the first wireless network is a Wi-Fi wireless network, and the second wireless network is a 2G/Global System for Mobile (GSM) communications network. In some embodiments, computing the second similarity score comprises: obtaining second current RSSIs of a serving cell and neighbor cells at the current positioning location and second previous RSSIs of the serving cell and the neighbor cells at the previous positioning location; and computing the second similarity score according to the second current RSSIs and the second previous RSSIs. In some embodiments, the second threshold is greater than the first threshold. In some embodiments, the first wireless network is a Wi-Fi wireless network and the second wireless network is a 3G/universal mobile telecommunications system (UMTS) communications network. In some embodiments, comparing the cell IDs at the current positioning time and the previous positioning times comprises: determining whether a current cell ID identifying a serving cell connected to the mobile device at the current positioning time is one of a number of cell IDs, wherein the number of cell IDs identifies a number of cells which were most recently connected to the mobile device at the previous positioning times and are unique, wherein the condition comprises the current cell ID being one of the number of cell IDs. In some embodiments, after determining that the mobile device has not moved, the method further comprises: determining whether the previous positioning location is a stabilized location; and setting the final positioning location equal to the previous positioning location after determining that the positioning location is a stabilized location.

In a preferred embodiment, a location-determining device is provided in the disclosure. The location-determining device comprises a control circuit, a processor, and a memory. The processor is installed in the control circuit. The memory is installed in the control circuit and is operatively coupled to the processor. The processor is configured to execute a program code stored in the memory to perform operations comprising: receiving current positioning information from a mobile device; comparing a current Mobile Country Code (MCC) comprised in the current positioning information with a previous MCC comprised in previous positioning information from the mobile device; determining whether a moving speed of the mobile device is greater than a speed threshold according the current positioning information and the previous positioning information when the current MCC is the same as the previous MCC; determining whether the mobile device has moved after determining that the moving speed is not greater than the speed threshold; and identifying a final positioning location according to a determination result indicating whether the mobile device has moved.

In some embodiments, the processor further executes the program code stored in the memory to perform operations comprising: setting the final positioning location equal to a current positioning location comprised in the current positioning information when the current MCC is not the same as the previous MCC. In some embodiments, the processor further executes the program code stored in the memory to perform operations comprising: setting the final positioning location to null after determining that the moving speed is greater than the speed threshold. In some embodiments, the processor further executes the program code stored in the memory to perform operations comprising: setting the final positioning location equal to a current positioning location comprised in the current positioning information after determining that the mobile device has moved. In some embodiments, the processor further executes the program code stored in the memory to perform operations comprising: setting the final positioning location equal to one of previous positioning locations comprised in the previous positioning information after determining that the mobile device has not moved. In some embodiments, the processor further executes the program code stored in the memory to perform operations such that determining whether the mobile device has moved comprises: computing a first similarity score between a current positioning location and a previous positioning location according to first current RSSIs and first previous RSSIs detected in a first wireless network; computing a second similarity score between the current positioning location and the previous positioning location or comparing cell identifiers (cell IDs) at a current positioning time and previous positioning times in a second wireless network; and determining that the mobile device has not moved when the first similarity score is greater than a first threshold and the second similarity score is greater than a second threshold or the first similarity score is greater than the first threshold and a comparison result satisfies a condition. In some embodiments, the first wireless network is a Wi-Fi wireless network, and the second wireless network is a 2G/Global System for Mobile (GSM) communications network. In some embodiments, the processor further executes the program code stored in the memory to perform operations such that computing the second similarity score comprises: obtaining second current RSSIs of a serving cell and neighbor cells at the current positioning location and second previous RSSIs of the serving cell and the neighbor cells at the previous positioning location; and computing the second similarity score according to the second current RSSIs and the second previous RSSIs. In some embodiments, the second threshold is greater than the first threshold. In some embodiments, the first wireless network is a Wi-Fi wireless network and the second wireless network is a 3G/universal mobile telecommunications system (UMTS) communications network. In some embodiments, the processor further executes the program code stored in the memory to perform operations such that comparing the cell IDs at the current positioning time and the previous positioning times comprises: determining whether a current cell ID identifying a serving cell connected to the mobile device at the current positioning time is one of a number of cell IDs, wherein the number of cell IDs identifies a number of cells which were most recently connected to the mobile device at the previous positioning times and are unique, wherein the condition comprises the current cell ID being one of the number of cell IDs. In some embodiments, after determining that the mobile device has not moved, the processor further executes the program code stored in the memory to perform operations comprises: determining whether the previous positioning location is a stabilized location; and setting the final positioning location equal to the previous positioning location after determining that the positioning location is a stabilized location.

BRIEF DESCRIPTION OF DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to the size in actual implementation in order to clearly illustrate the concept of the present disclosure.

FIGS. 6A-6C are schematic diagrams illustrating how to determine again whether the mobile device has moved based on the positioning locations according to one embodiment of the present disclosure.

DETAILED DESCRIPTION OF THE INVENTION

Figure 1:
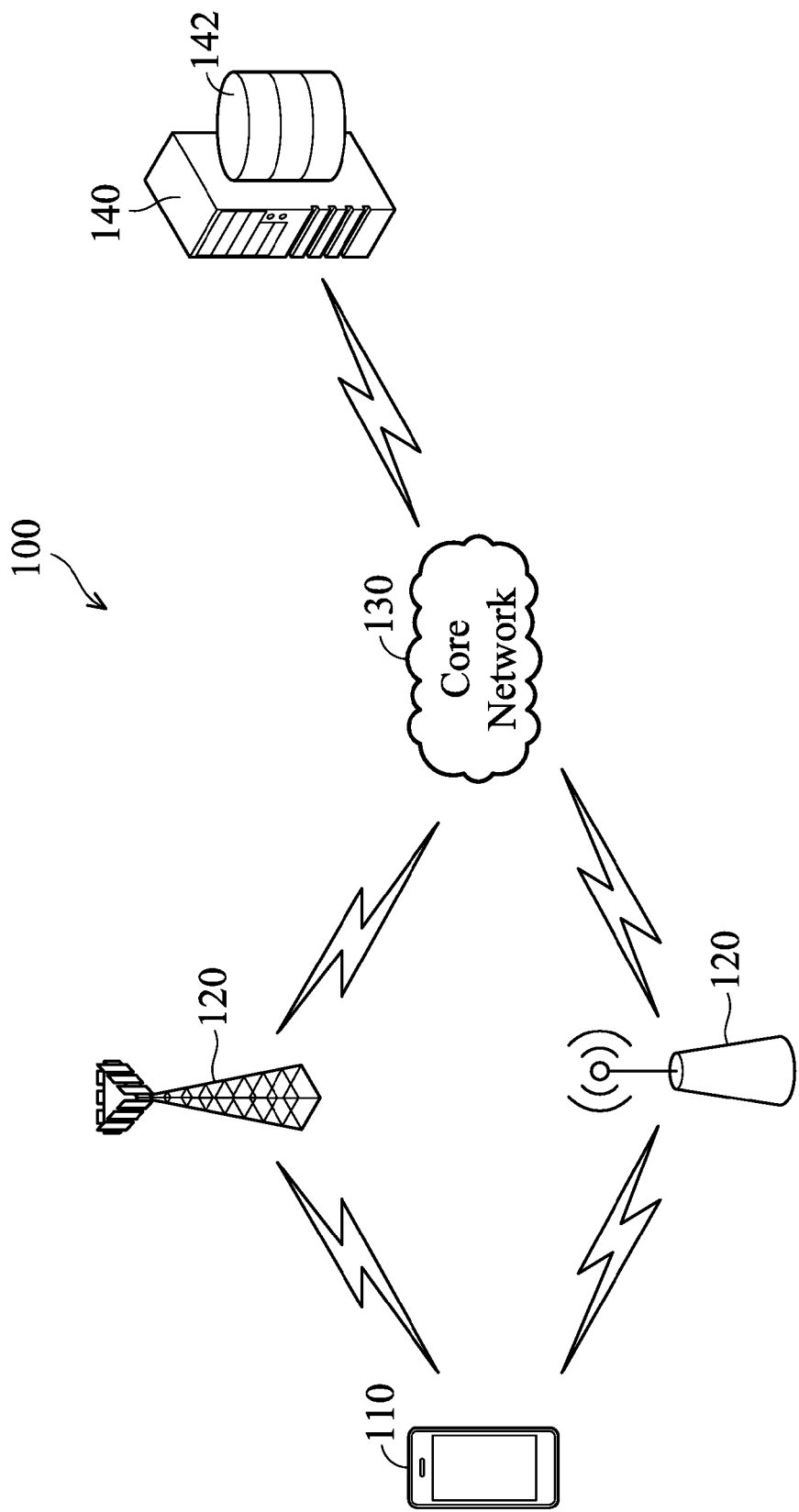
FIG. 1 is a schematic diagram illustrating the architecture of a communications system in accordance with one embodiment of the disclosure.

Several exemplary embodiments of the present disclosure are described with reference to FIGS. 1 through 6C which generally relate to a method and a location-determining device for correcting a positioning location. It should be understood that the following disclosure provides various embodiments as examples for implementing different features of the present disclosure. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

Discussions herein utilizing terms such as, for example, "processing", "computing", "calculating", "determining", "obtaining", "setting", "identifying", or the like, may refer to operation(s) and/or process(es) of a computer, a computing platform, a computing system, or other electronic computing device, that manipulate and/or transforms data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items. Furthermore, like numerals refer to like elements throughout the several views, and the articles "a" and "the" includes plural references, unless otherwise specified in the description.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Furthermore, repeated use of the phrase "in one embodiment" does not necessarily refer to the same embodiment, although it may.

FIG. 1 is a schematic diagram illustrating the architecture of a communications system 100 in accordance with one embodiment of the disclosure. As shown in FIG. 1, the communications system 100 may include a mobile device 110, a plurality of access points 120 (e.g., base stations, eNBs, or WLAN access points), a server 140 (e.g., a positioning server or a crowdsourcing server) and a core network 130.

The access points 120 may each have a unique identifier, such as a MAC address, and a transmission signal strength for a predetermined distance, and may each provide communication coverage for a respective geographic area. The access points 120 can be a type of conventional access point for transmitting data wirelessly, and they need not all be the same as one another.

In some embodiments, an access point 120 may be referred to as a base station, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, or some other suitable terminology. The communications system 100 may include access points 120 of different types (e.g., macro, micro, and/or pico base stations). The access points 120 may also utilize different radio technologies. The access points 120 may be associated with the same or different access networks. The coverage areas of different access points 120, including the coverage areas of the same or different types of access points 120, utilizing the same or different radio technologies, and/or belonging to the same or different access networks, may overlap.

The mobile device 110 may be a device that is capable of detecting the access points 120 at different locations through signals transmitted from the access points 120. For example, the mobile device 110 may be a mobile phone, a personal digital assistant (PDA), a laptop computer, a tablet computer, or another type of mobile computation or communications device.

The mobile device 110 can be connected to the server 140 through the core network 130. The core network 130 may be any suitable network, including a Wireless Local Area Network, a Wi-Fi Network, a Universal Mobile Telecommunications System (UMTS) communications network, a cellular network, 3G network, a 2G network, or a Global System for Mobile (GSM) communications network, etc. As the signals are received from the access points 120, the access point identifiers and associated signal strengths at each respective location of the mobile device 110 may be recorded. For example, the wireless data may be stored in the mobile device 110 and uploaded to the server 140, or it may be dynamically transmitted to the server 140 from the mobile device 110.

The server 140 has a positioning location database 142, which contains positioning information, for example, Mobile Country Codes (MCCs) for different locations, positioning locations of the mobile device, and times when the mobile device is at different positioning locations. In another embodiment, the positioning location database 142 may contain location information pertaining to a variety of signal strength parameters, which may be a received signal strength indicator (RSSI).

Figure 2:
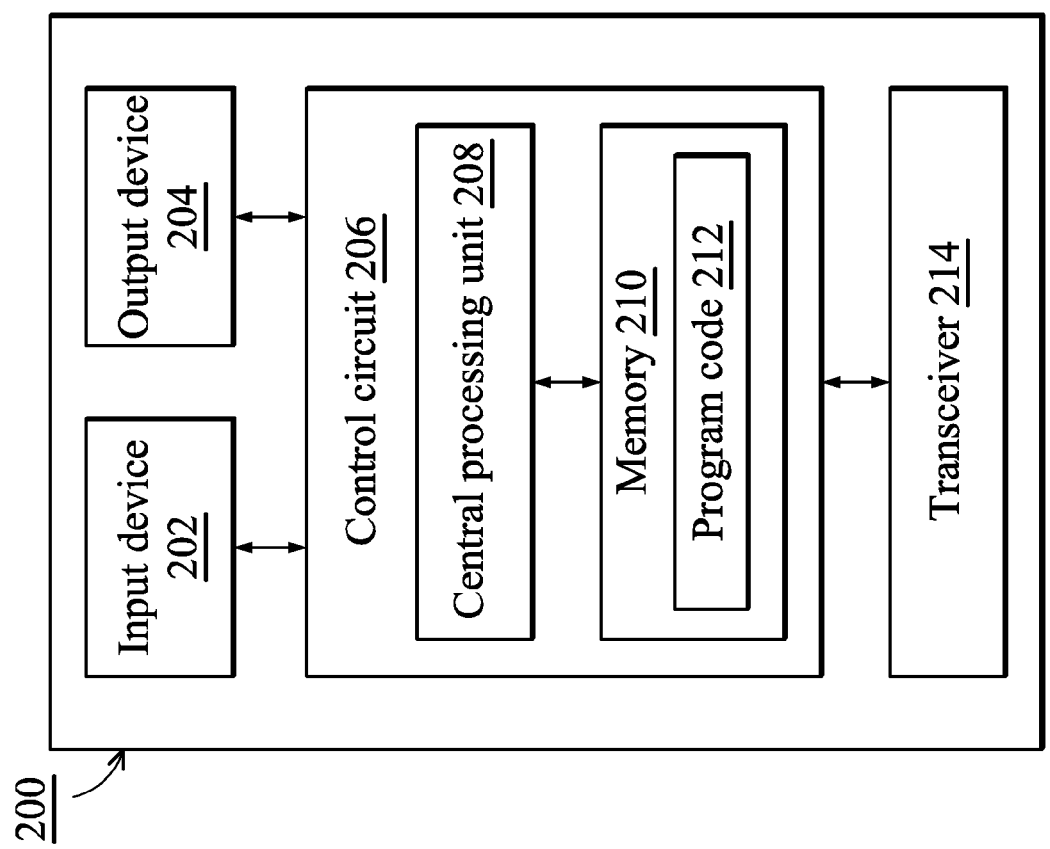
FIG. 2 shows an alternative simplified functional block diagram of a location-determining device according to one embodiment of the present disclosure.

Next, turning to FIG. 2, FIG. 2 shows an alternative simplified functional block diagram of a location-determining device 200 according to one embodiment of the present disclosure. As shown in FIG. 2, the location-determining device 200 can be utilized for realizing the mobile device 110 or the server 140. In another embodiment, the location-determining device 200 could be an independent device which is remote from the mobile device 110, and receives data from the mobile device 110 and the server 140 through a communications link. The location-determining device 200 may include an input device 202, an output device 204, a control circuit 206, a central processing unit (CPU) 208, a memory 210, a program code 212, and a transceiver 214. The control circuit 206 executes the program code 212 in the memory 210 through the CPU 208, thereby controlling the operation of the location-determining device 200. The location-determining device 200 can receive signals input by a user through the input device 202, such as a keyboard or keypad, and can output images and sound through the output device 204, such as a monitor or speakers. The transceiver 214 is used to receive and transmit wireless signals wirelessly, deliver received signals to the control circuit 206, and output signals generated by the control circuit 206.

Figure 3:
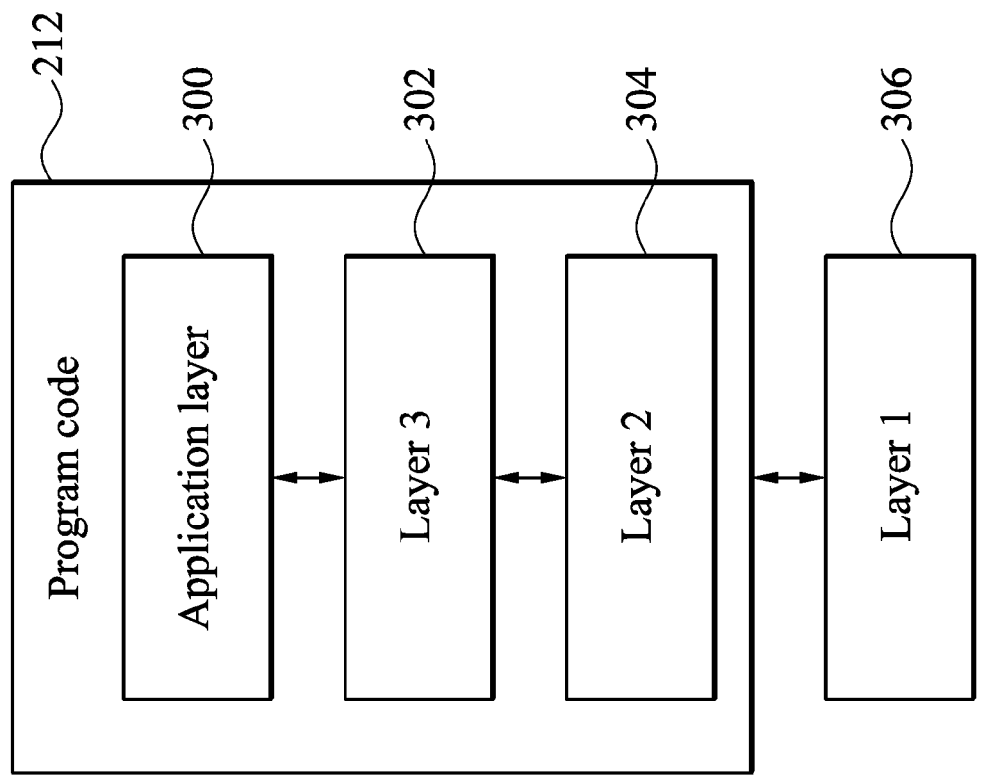
FIG. 3 is a simplified block diagram of the program code shown in FIG. 2 in accordance with one embodiment of the disclosure.

FIG. 3 is a simplified block diagram of the program code 212 shown in FIG. 2 in accordance with one embodiment of the disclosure. In this embodiment, the program code 212 includes an application layer 300, a Layer 3 portion 302, and a Layer 2 portion 304, and is coupled to a Layer 1 portion 306. The Layer 3 portion 302 generally performs radio resource control. The Layer 2 portion 304 generally performs link control. The Layer 1 portion 306 generally performs physical connections.

Figure 4:
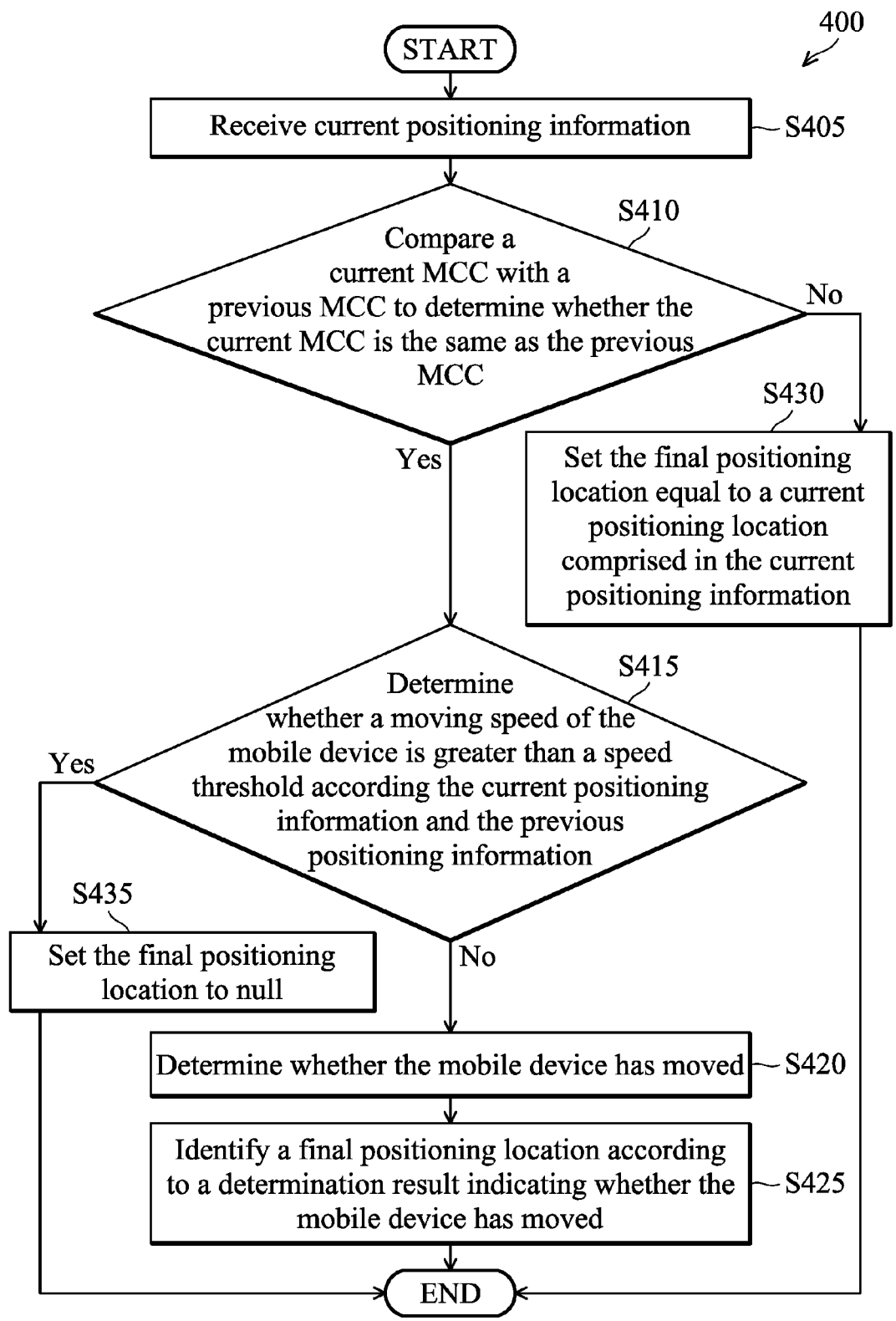
FIG. 4 is a flow diagram illustrating a method for correcting a positioning location according to an embodiment of the present disclosure.

FIG. 4 is a flow diagram 400 illustrating a method for correcting a positioning location according to an embodiment of the present disclosure. The method is used in a location-determining device. In step S405, the location-determining device receives current positioning information from a mobile device. Next, in step S410, the location-determining device compares a current Mobile Country Code (MCC) comprised in the current positioning information with a previous MCC comprised in previous positioning information to determine whether the current MCC is the same as the previous MCC, wherein the previous positioning information can be obtained from the server or the mobile device.

When the current MCC is the same as the previous MCC ("Yes" in step S410), in step S415, the location-determining device determines whether a moving speed of the mobile device is greater than a speed threshold according the current positioning information and the previous positioning information, wherein the moving speed may be calculated according to a time interval and a distance relevant to the current positioning location and the previous positioning location.

Next, after the location-determining device determines that the moving speed is not greater than the speed threshold ("No" in step S415), in step S420, the location-determining device determines whether the mobile device has moved. The details of determining whether the mobile device has moved are described below and with respect to FIG. 5 and FIGS. 6A-6C. In step S425, the location-determining device identifies a final positioning location according to a determination result indicating whether the mobile device has moved.

Referring back to step S410, when the current MCC is not the same as the previous MCC ("No" in step S410), in step S430, the location-determining device sets the final positioning location equal to a current positioning location comprised in the current positioning information.

After the location-determining device determines that the moving speed is greater than the speed threshold ("Yes" in step S415), in step S435, the location-determining device sets the final positioning location to null. In other words, the final positioning location is not reported by the location-determining device.

Determination of Whether the Mobile Device has Moved

The determination can be divided into two steps: Step I is a determination of whether the mobile device has moved in two wireless networks, the Wi-Fi wireless network and the cellular network, and Step II is a determination of whether the mobile device has moved between the current positioning location and the previous positioning locations.

Step I:

Wi-Fi Wireless Network

The location-determining device can obtain first current received signal strength indicators (RSSIs) reported by a first number of access points (APs) at the current positioning location and first previous RSSIs reported by a second number of APs at the previous positioning location from the mobile device. Then, the location-determining device computes a first similarity score between the current positioning location and the previous positioning location according to the first current RSSIs and the first previous RSSIs detected in the Wi-Fi wireless network. The first similarity score 'S$_1$' is calculated as:

$$S_1 = 100 - \frac{1}{N}\sum_{i=1}^{N}|rssi_{i,c} - rssi_{i,p}|,$$

wherein N is the number of APs in the union of the first number of APs detected at the current positioning location and the second number of APs detected at the previous positioning location. $rssi_{i,c}$ denotes the RSSI of the ith AP at the current positioning location, and $rssi_{i,p}$ denotes the RSSI of the ith AP at the previous positioning location. It should be noted that when the ith AP was scanned at the previous positioning location but not at the current positioning location, $rssi_{i,c}$ is set to −150 as a penalty score. The same penalty apply when the i-th AP was scanned at current location but not at the previous location, $rssi_{i,p}$ is set to −150. When N is 0 (i.e., no APs detected at either positioning location), S$_1$ is set to 0. When S$_1$ is not greater than a first threshold, the location-determining device determines that it has moved. In one embodiment, the first threshold could be set to, for example, 50.

Cellular Network

For a 2G/Global System for Mobile (GSM) communications network, the mobile device can detect and report not only a serving cell connecting to the mobile device but also neighboring cells. Hence a second similarity score can be computed like in the formula used to compute the first similarity score. The location-determining device can obtain second current RSSIs of the serving cell and the neighbor cells at the current positioning location and second previous RSSIs of the serving cell and the neighbor cells at the previous positioning location from the server. Then, the location-determining device computes the second similarity score according to the second current RSSIs and the second previous RSSIs. The second similarity score 'S$_2$' is calculated as:

$$S_2 = 100 - \frac{1}{N}\sum_{i=1}^{N}|rssi_{i,c} - rssi_{i,p}|,$$

wherein N is the number of cells in the union of the cells at the current positioning location and the number of the cells at the previous positioning location. $rssi_{i,c}$ denotes the RSSI of the ith cell at the current positioning location, and $rssi_{i,p}$ denotes the RSSI of the ith cell at the previous positioning location. It should be noted that when the ith cell was scanned at the previous positioning location but not at the current positioning location, $rssi_{i,c}$ is set to −150 as a penalty score. The same penalty apply when the i-th cell was scanned at current location but not at the previous location, $rssi_{i,p}$ is set to −150. When N is 0 (i.e., no cells detected at either positioning location), S$_2$ is set to 0. When S$_2$ is not greater than a second threshold, the location-determining device determines that the mobile device has moved at the current positioning location. In one embodiment, the second threshold could be set to, for example, 70.

In another embodiment, the second threshold used in 2G/GSM communications network is greater than the first threshold used in Wi-Fi wireless network, since the fluctuation of Wi-Fi network is faster and higher than cellular network.

For a 3G/universal mobile telecommunications system (UMTS) communications network, since the mobile device may record cell identifiers (cell IDs) of its current serving cell when accessing a cellular network each time it scans for and acquires a particular access point, the cell IDs are used to determine whether the mobile device has moved. The location-determining device compares the cell IDs at a current positioning time and previous positioning times. Specifically, the location-determining device can determine whether a current cell ID identifying the serving cell connected to the mobile device at the current positioning time is one of a number of cell IDs, wherein the number of cell IDs identifies a number of cells which were most recently connected to the mobile device at the previous positioning times and are unique. When the current cell ID is one of the number of cell IDs, the location-determining device determines that the mobile device has not moved at the current positioning location.

Figure 5:
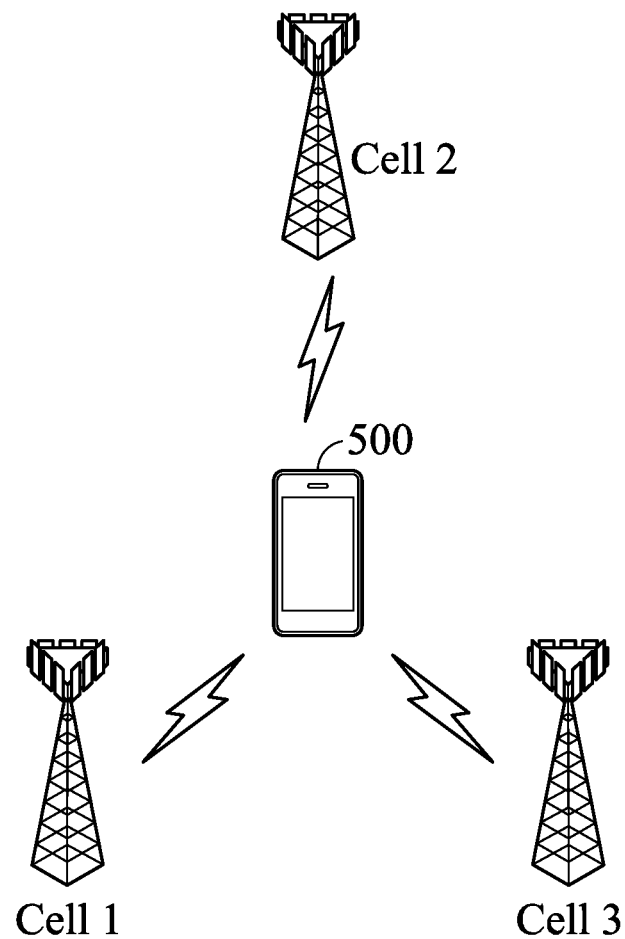
FIG. 5 is a schematic diagram illustrating how to determine whether the mobile device has moved based on the cell IDs in 3G/UMTS communications network according to one embodiment of the present disclosure.

For example, FIG. 5 is a schematic diagram illustrating how to determine whether the mobile device 500 has moved based on the cell IDs in 3G/UMTS communications network according to one embodiment of the present disclosure. The mobile device 500 may store 3 cell IDs, 1, 2 and 3, wherein the 3 cell IDs identify 3 unique cells, cell 1, cell 2, and cell 3, which were most recently connected to the mobile device. In this example, the mobile device may be connected to cell 1, cell 2, and cell 3 at positioning times t1, t2, and t3, respectively. The mobile device is connected to cell 1 at the current positioning time. The current cell ID is 1 which is one of the 3 cell IDs. Therefore, the location-determining device determines that the mobile device has not moved according to the cell IDs and the corresponding positioning times obtained from the mobile device.

In step I, the location-determining device may set the final positioning location equal to the current positioning location after determining that the mobile device has moved.

Step II:

After determining that the mobile device has not moved in the Wi-Fi wireless network and the cellular network, the location-determining device may determine again whether the mobile device has not moved between the current positioning location and the previous positioning locations. In this step, the location-determining device needs to examine the current positioning location and at least two successive and previous positioning locations.

Figure 6C:
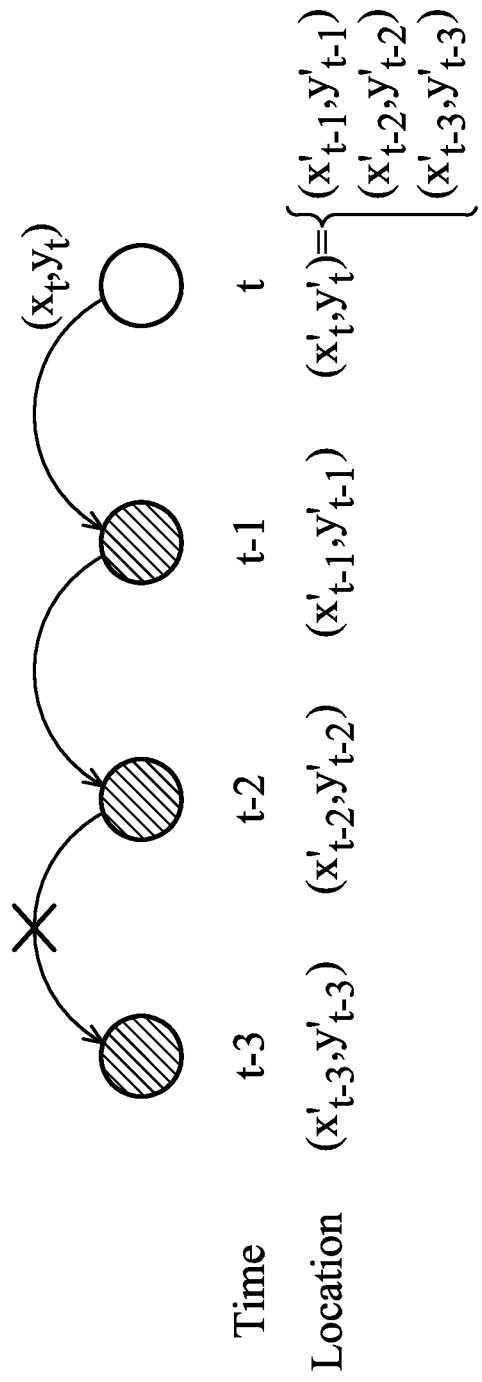

FIGS. 6A-6C are schematic diagrams illustrating how to determine again whether the mobile device has moved based on the positioning locations according to one embodiment of the present disclosure.

In FIG. 6A, it is determined that the mobile device has moved according to the determination of step I. In other words, the current positioning location $(x_t, y_t)$ of the mobile device at the current positioning time t is not similar to the previous positioning location $(x_{t-1}', y_{t-1}')$ at the previous positioning time t−1. Therefore, the location-determining device sets the final positioning location $(x_t', y_t')$ equal to the current positioning location $(x_t, y_t)$.

When the location-determining device determines that the mobile device has not moved according to the determination of step I, the location-determining device further determines whether the previous positioning location $(x_{t-1}', y_{t-1}')$ is a "stabilized" location.

This can be divided into two cases, (1) $(x_{t-1}', y_{t-1}')$ is a "stabilized" location, and (2) $(x_{t-1}', y_{t-1}')$ is not a "stabilized" location. We define that when a positioning location is similar to at least two successive and previous positioning locations, a tag "stabilized" is given to the positioning location.

For case (1) $(x_{t-1}', y_{t-1}')$ is a "stabilized" location. It means that the positioning location $(x_{t-1}', y_{t-1}')$ at the previous positioning time t−1 is similar to the positioning location $(x_{t-2}', y_{t-2}')$ at the previous positioning time t−2, and the positioning location $(x_{t-2}', y_{t-2}')$ at the previous positioning time t−2 is similar to the positioning location $(x_{t-3}', y_{t-3}')$ at the previous positioning time t−3, as shown in FIG. 6B. Since the positioning location $(x_{t-1}', y_{t-1}')$ and its successive and previous two positioning locations are similar, the tag "stabilized" is given to the positioning location $(x_{t-1}', y_{t-1}')$. Therefore, the location-determining device may set the final positioning location $(x_t', y_t')$ equal to the positioning location $(x_{t-1}', y_{t-1}')$ when the previous positioning location $(x_{t-1}', y_{t-1}')$ is a "stabilized" location.

For case (2) $(x_{t-1}', y_{t-1}')$ is not a "stabilized" location. The positioning location $(x_{t-1}', y_{t-1}')$ at the previous positioning time t−1 may be similar to the positioning location $(x_{t-2}', y_{t-2}')$ at the previous positioning time t−2, but the positioning location $(x_{t-2}', y_{t-2}')$ at the previous positioning time t−2 is not similar to the positioning location $(x_{t-3}', y_{t-3}')$ at the previous positioning time t−3, as shown in FIG. 6C. Since the positioning location $(x_{t-2}', y_{t-2}')$ and its successive and previous positioning location $(x_{t-3}', y_{t-3}')$ are not similar, the positioning location $(x_{t-1}', y_{t-1}')$ does not have the tag "stabilized". Therefore, the location-determining device may select a positioning location with the highest confidence from the positioning locations $(x_{t-1}', y_{t-1}')$, $(x_{t-2}', y_{t-2}')$ and $(x_{t-3}', y_{t-3}')$ as the final positioning location, and may also add the tag "stabilized" to the current positioning location $(x_t, y_t)$, wherein the confidence can be computed based on the distance between the mobile device and the positioning location.

In addition, the CPU 208 could execute the program code 212 to perform all of the above-described actions and steps or others described herein.

Therefore, the problem of position jumps and positioning jitter can be reduced by using the method for correcting a positioning location, so that the correctness of the positioning location can be improved further.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using another structure, functionality, or structure and functionality in addition to or other than one or more of the aspects set forth herein.

Those with skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in ways that vary for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or another programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general-purpose processor may be a microprocessor, but in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It should be understood that any specific order or hierarchy of steps in any disclosed process is an example of a sample approach. It should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of exemplary embodiment, it is to be understood that the disclosure is not limited thereto. Those who are skilled in this technology can still make various alterations and modifications without departing from the scope and spirit of this disclosure. Therefore, the scope of the present disclosure shall be defined and protected by the following claims and their equivalents.

What is claimed is:

1. A method for correcting a positioning location, comprising:
   receiving current positioning information from a mobile device;
   comparing a current Mobile Country Code (MCC) comprised in the current positioning information with a previous MCC comprised in previous positioning information from the mobile device;
   determining whether a moving speed of the mobile device is greater than a speed threshold according the current positioning information and the previous positioning information when the current MCC is the same as the previous MCC;
   determining whether the mobile device has moved after determining that the moving speed is not greater than the speed threshold; and
   identifying a final positioning location according to a determination result indicating whether the mobile device has moved.

2. The method for correcting a positioning location as claimed in claim 1, further comprising:
   setting the final positioning location equal to a current positioning location comprised in the current positioning information when the current MCC is not the same as the previous MCC.

3. The method for correcting a positioning location as claimed in claim 1, further comprising:
   setting the final positioning location to null after determining that the moving speed is greater than the speed threshold.

4. The method for correcting a positioning location as claimed in claim 1, further comprising:
   setting the final positioning location equal to a current positioning location comprised in the current positioning information after determining that the mobile device has moved.

5. The method for correcting a positioning location as claimed in claim 1, further comprising:
   setting the final positioning location equal to one of previous positioning locations comprised in the previous positioning information after determining that the mobile device has not moved.

6. The method for correcting a positioning location as claimed in claim 1, wherein determining whether the mobile device has moved comprises:
   computing a first similarity score between a current positioning location and a previous positioning location according to first current RSSIs and first previous RSSIs detected in a first wireless network;
   computing a second similarity score between the current positioning location and the previous positioning location or comparing cell identifiers (cell IDs) at a current positioning time and previous positioning times in a second wireless network; and
   determining that the mobile device has not moved when the first similarity score is greater than a first threshold and the second similarity score is greater than a second threshold or the first similarity score is greater than the first threshold and a comparison result satisfies a condition.

7. The method for correcting a positioning location as claimed in claim 6, wherein the first wireless network is a Wi-Fi wireless network, and the second wireless network is a 2G/Global System for Mobile (GSM) communications network.

8. The method for correcting a positioning location as claimed in claim 7, wherein computing the second similarity score comprises:
   obtaining second current RSSIs of a serving cell and neighbor cells at the current positioning location and second previous RSSIs of the serving cell and the neighbor cells at the previous positioning location; and
   computing the second similarity score according to the second current RSSIs and the second previous RSSIs.

9. The method for correcting a positioning location as claimed in claim 8, wherein the second threshold is greater than the first threshold.

10. The method for correcting a positioning location as claimed in claim 6, wherein the first wireless network is a Wi-Fi wireless network and the second wireless network is a 3G/universal mobile telecommunications system (UMTS) communications network.

11. The method for correcting a positioning location as claimed in claim 10, wherein comparing the cell IDs at the current positioning time and the previous positioning times comprises:

determining whether a current cell ID identifying a serving cell connected to the mobile device at the current positioning time is one of a number of cell IDs, wherein the number of cell IDs identifies a number of cells which were most recently connected to the mobile device at the previous positioning times and are unique, wherein the condition comprises the current cell ID being one of the number of cell IDs.

12. The method for correcting a positioning location as claimed in claim 6, after determining that the mobile device has not moved, the method further comprises:

determining whether the previous positioning location is a stabilized location; and setting the final positioning location equal to the previous positioning location after determining that the positioning location is a stabilized location.

13. A location-determining device, comprising:
a control circuit;
a processor installed in the control circuit;
a memory installed in the control circuit and operatively coupled to the processor;
wherein the processor is configured to execute a program code stored in the memory to perform operations comprising:
receiving current positioning information from a mobile device;
comparing a current Mobile Country Code (MCC) comprised in the current positioning information with a previous MCC comprised in previous positioning information from the mobile device;
determining whether a moving speed of the mobile device is greater than a speed threshold according the current positioning information and the previous positioning information when the current MCC is the same as the previous MCC;
determining whether the device has moved after determining that the moving speed is not greater than the speed threshold; and
identifying a final positioning location according to a determination result indicating whether the mobile device has moved.

14. The location-determining device as claimed in claim 13, wherein the processor further executes the program code stored in the memory to perform operations comprising:

setting the final positioning location equal to a current positioning location comprised in the current positioning information when the current MCC is not the same as the previous MCC.

15. The location-determining device as claimed in claim 13, wherein the processor further executes the program code stored in the memory to perform operations comprising:

setting the final positioning location to null after determining that the moving speed is greater than the speed threshold.

16. The location-determining device as claimed in claim 13, wherein the processor further executes the program code stored in the memory to perform operations comprising:

setting the final positioning location equal to a current positioning location comprised in the current positioning information after determining that the mobile device has moved.

17. The location-determining device as claimed in claim 13, wherein the processor further executes the program code stored in the memory to perform operations comprising:

setting the final positioning location equal to one of previous positioning locations comprised in the previous positioning information after determining that the mobile device has not moved.

18. The location-determining device as claimed in claim 13, wherein the processor further executes the program code stored in the memory to perform operations such that determining whether the mobile device has moved comprises:

computing a first similarity score between a current positioning location and a previous positioning location according to first current RSSIs and first previous RSSIs detected in a first wireless network;

computing a second similarity score between the current positioning location and the previous positioning location or comparing cell identifiers (cell IDs) at a current positioning time and previous positioning times in a second wireless network; and determining that the mobile device has not moved when the first similarity score is greater than a first threshold and the second similarity score is greater than a second threshold or the first similarity score is greater than the first threshold and a comparison result satisfies a condition.

19. The location-determining device as claimed in claim 18, wherein the first wireless network is a Wi-Fi wireless network, and the second wireless network is a 2G/Global System for Mobile (GSM) communications network.

20. The location-determining device as claimed in claim 19, wherein the processor further executes the program code stored in the memory to perform operations such that computing the second similarity score comprises:

obtaining second current RSSIs of a serving cell and neighbor cells at the current positioning location and second previous RSSIs of the serving cell and the neighbor cells at the previous positioning location; and computing the second similarity score according to the second current RSSIs and the second previous RSSIs.

21. The location-determining device as claimed in claim 20, wherein the second threshold is greater than the first threshold.

22. The location-determining device as claimed in claim 18, wherein the first wireless network is a Wi-Fi wireless network and the second wireless network is a 3G/universal mobile telecommunications system (UMTS) communications network.

23. The location-determining device as claimed in claim 22, wherein the processor further executes the program code stored in the memory to perform operations such that comparing the cell IDs at the current positioning time and the previous positioning times comprises:

determining whether a current cell ID identifying a serving cell connected to the mobile device at the current positioning time is one of a number of cell IDs, wherein the number of cell IDs identifies a number of cells which were most recently connected to the mobile device at the previous positioning times and are unique, wherein the condition comprises the current cell ID being one of the number of cell IDs.

24. The location-determining device as claimed in claim 18, wherein after determining that the mobile device has not moved, the processor further executes the program code stored in the memory to perform operations comprises:
    determining whether the previous positioning location is a stabilized location; and
    setting the final positioning location equal to the previous positioning location after determining that the positioning location is a stabilized location.

\* \* \* \* \*

UNITED STATES PATENT AND TRADEMARK OFFICE
CERTIFICATE OF CORRECTION

PATENT NO. : 9,801,154 B1  
APPLICATION NO. : 15/482607  
DATED : October 24, 2017  
INVENTOR(S) : Chun-Nan Chen and Ivy H. Tseng Page 1 of 1

It is certified that error appears in the above-identified patent and that said Letters Patent is hereby corrected as shown below:

On the Title Page

Item (73), should read:  
--Assignee: Home Intelligence Co., LTD., Taipei City (TW)--

Signed and Sealed this  
Twentieth Day of November, 2018

Andrei Iancu  
*Director of the United States Patent and Trademark Office*